US009136745B2

(12) United States Patent
Nagahama et al.

(10) Patent No.: US 9,136,745 B2
(45) Date of Patent: Sep. 15, 2015

(54) ELECTRIC VEHICLE DRIVING SYSTEM

(75) Inventors: Teruo Nagahama, Saitama (JP);
Norikazu Kawai, Saitama (JP); Heisuke Kobayashi, Saitama (JP); Shinji Fujimoto, Saitama (JP); Atsuhiro Sakai, Saitama (JP); Seiichi Mogi, Saitama (JP); Hironori Mito, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 218 days.

(21) Appl. No.: 13/821,760

(22) PCT Filed: Oct. 5, 2010

(86) PCT No.: PCT/JP2010/067483
§ 371 (c)(1),
(2), (4) Date: Mar. 8, 2013

(87) PCT Pub. No.: WO2012/046307
PCT Pub. Date: Apr. 12, 2012

(65) Prior Publication Data
US 2013/0169073 A1    Jul. 4, 2013

(51) Int. Cl.
*H02K 1/32* (2006.01)
*H02K 9/19* (2006.01)
*H02K 5/02* (2006.01)
*H02K 11/00* (2006.01)
*H02K 5/08* (2006.01)
*H02K 11/02* (2006.01)

(52) U.S. Cl.
CPC .. *H02K 9/19* (2013.01); *H02K 5/02* (2013.01);
*H02K 5/08* (2013.01); *H02K 11/0005*
(2013.01); *H02K 11/022* (2013.01); *Y02T*
*10/641* (2013.01)

(58) Field of Classification Search
CPC ........ H02K 11/0005; H02K 5/02; H02K 9/19
USPC .............. 310/52, 54, 58, 64, 75 R, 76, 77, 78
See application file for complete search history.

(56) References Cited

U.S. PATENT DOCUMENTS

| 2008/0316786 A1* | 12/2008 | Murakami et al. ............ 363/141 |
| 2009/0127954 A1* | 5/2009 | Mogi .............................. 310/90 |

FOREIGN PATENT DOCUMENTS

| CN | 1675814 A | 9/2005 |
| JP | 4-36363 U | 3/1992 |
| JP | 05-236717 A | 9/1993 |
| JP | 05-310048 A | 11/1993 |
| JP | 06-36363 U | 5/1994 |

(Continued)

OTHER PUBLICATIONS

Office Action dated Jul. 14, 2014, issued in corresponding Russian Patent Application No. 2013115114, with English Translation (5 pages).

(Continued)

*Primary Examiner* — Hanh Nguyen
(74) *Attorney, Agent, or Firm* — Westerman, Hattori, Daniels & Adrian, LLP

(57) ABSTRACT

A side cover 82 which covers a side surface portion of an electric motor 7 is formed of a resin, and a lubricant is ejected from plural ejecting holes 95 of an oil path 90 formed in the side cover 82 to a stator 71 of the electric motor 7 so as to cool the stator.

12 Claims, 11 Drawing Sheets

(56) References Cited

FOREIGN PATENT DOCUMENTS

| | | |
|---|---|---|
| JP | 11-300638 A | 2/1999 |
| JP | 11-300638 A | 11/1999 |
| JP | 2005-348535 A | 12/2005 |
| JP | 2006-282158 A | 10/2006 |
| RU | 2061991 C1 | 6/1996 |
| WO | 2010/109959 A1 | 9/2010 |

OTHER PUBLICATIONS

Office Action dated Oct. 8, 2014, issued in corresponding Chinese Patent Application No. 201080068757.4 (9 pages).
Office Action dated Oct. 14, 2014, issued in corresponding Japanese Patent Application No. 2011-535831 (4 pages).
International Search Report for PCT/JP2010/067483, mailing date of Dec. 7, 2010.

* cited by examiner

ELECTRIC VEHICLE DRIVING SYSTEM

TECHNICAL FIELD

The present invention relates to an electric vehicle driving system, and particularly, to an electric vehicle driving system that cools an electric motor using a lubricant.

BACKGROUND ART

A known hybrid vehicle includes an internal combustion engine and an electric motor serving as a power source and appropriately converts the driving torques generated therefrom so as to be supplied to a drive-train depending on a traveling status. In the hybrid vehicle, heat is generated when the electric motor drives or is driven for regeneration, and the efficiency of the electric motor is degraded due to the generated heat. To handle such generated heat, the size of the electric motor is increased, or the electric motor is cooled by water-cooling using an installed water jacket or by oil-cooling using an oil pump for pressurizing a lubricant (cooling oil) of a transmission so as to be effected to the electric motor (for example, see PTL 1). PTL 1 discloses the motor controller and the control method thereof for ensuring the flow rate of the lubricant at a low-temperature at which the viscosity of the lubricant increases. When the temperature of the lubricant is a predetermined temperature or less, the lubricant is heated by controlling a voltage and a current supplied to the electric motor so as to increase the loss of the electric motor.

CITATION LIT

Patent Literature

PTL 1: JP-2005-348535-A

SUMMARY OF INVENTION

Technical Problem

In PTL 1, when the temperature of the cooling lubricant is low, the voltage and the current supplied to the electric motor are controlled so as to increase the temperature of the lubricant and so as to decrease the viscosity of the lubricant. Thus, the flow rate of the lubricant is ensured so as to effectively cool the electric motor. However, the specific lubricant supply path or the structure thereof is not described.

Further, while the side surface portion of the electric motor is covered by the side cover of the casing, the side cover is formed of a metal material such as aluminum alloy, and an insulating distance or a dedicated insulating member needs to be provided so as to ensure the insulating property from the electric motor.

The invention is made in view of the above-described problems, and it is an object of the invention to provide an electric vehicle driving system that prevents efficiency degradation of an electric motor due to a temperature increase by efficiently cooling a heat generating portion of an electric motor and decreases the size, the weight, and the cost of a transmission.

Solution to Problem

To attain the above-described object, a first aspect includes
an electric vehicle driving system (e.g., a driving system 1 in embodiment) including:
an electric motor (e.g., an electric motor 7 in embodiment) serving as a power source;
a transmission (e.g., a speed changer 20 in embodiment);
a casing (e.g., a casing 80 in embodiment) accommodating the electric motor and the transmission,
wherein the casing includes a side cover (e.g., a side cover 82 in embodiment) that covers a side surface portion of the electric motor, and
wherein the side cover is formed of a resin and forms an oil path (e.g., an oil path 90 in embodiment) that supplies a cooling lubricant to a heat generating portion (e.g., a coil 71c in embodiment) of the electric motor.

A second aspect includes, based on the first aspect, the system,
wherein the heat generating portion of the electric motor is a coil (e.g., a coil 71c in embodiment) of a substantially annular stator (e.g., a stator 71 in embodiment), and
wherein the side cover includes plural ejecting holes (e.g., ejecting holes 95 in embodiment) that eject the lubricant toward an upper semicircular portion of the stator.

A third aspect includes, based on the second aspect, the system,
wherein the oil path includes:
a radial oil feeding path (e.g., a radial oil feeding path 92 in embodiment) that is formed in the radial direction from the center of the side cover; and
a substantially semicircular oil feeding path (e.g., a substantially semicircular oil feeding path 91 in embodiment) that communicates with the radial oil feeding path and is formed so as to correspond to the upper semicircular portion of the stator, the oil path communicating with an oil path (e.g., an oil feeding hole 11a in embodiment) provided in a shaft (e.g., a first main shaft 11 in embodiment) of the transmission, and
wherein the plural ejecting holes are circumferentially arranged in the substantially semicircular oil feeding path at intervals.

A fourth aspect includes, based on the first aspect, the system,
wherein the oil path is formed inside the side cover by welding a separate resin member (e.g., an oil path forming member 84 in embodiment).

A fifth aspect includes, based on the first aspect, the system,
wherein a metallic member (e.g., a metallic member 100 in embodiment) is disposed in the side cover by insert-molding so as to suppress radio noise.

A sixth aspect includes, based on the first aspect, the system,
wherein a motor-current-flowing-portion shielding material (e.g., a motor-current-flowing-portion shielding material 101 in embodiment) is provided between the side cover and the stator of the electric motor so as to suppress radio noise.

A seventh aspect includes, based on the first aspect, the system,
wherein metal plating is performed on the outer surface (e.g., an outer surface 82a in embodiment) of the side cover so as to suppress radio noise.

An eighth aspect includes, based on the second aspect, the system,
wherein the lubricant which is ejected from the plural ejecting holes toward the upper semicircular portion of the stator is accumulated in a lubricant reservoir of a lower portion of the casing due to the own weight and is pumped up by an oil pump (e.g., an oil pump 68 in embodiment) so as to be circulated.

A ninth aspect includes, based on the second aspect, the system, wherein the plural ejecting holes are arranged so as to eject the lubricant toward the coil of the upper semicircular portion of the stator, and wherein the coil of the lower semicircular portion of the stator is cooled by the own weight of the lubricant.

A tenth aspect includes, based on the second aspect, the system, wherein the plural ejecting holes are arranged so as to eject the lubricant toward radial center portions of bending portions (e.g., radial center portions 71c1 of bending portions in embodiment) of salient-pole-concentrated-winding coils of the stator.

An eleventh aspect includes, based on the second aspect, the system, wherein at least one of the plural ejecting holes is provided with a throttle valve (e.g., a throttle valve 95a in embodiment) that controls the flow rate of the ejected lubricant.

A twelfth aspect includes, based on the eleventh aspect, the system, wherein the throttle valve is closed when the output of the electric motor is in an air-cooling-handleable output range and is released when the output becomes higher than the air-cooling-handleable output range.

A thirteenth aspect includes, based on any one of the first to eleventh aspects, the system, wherein the lubricant accumulated in the lubricant reservoir of the lower portion of the casing is pumped up by the oil pump and is supplied to be distributed into an air compressor (e.g., an air compressor 67 in embodiment) and the oil path, and wherein the lubricant supplied to the oil path is distributed into the heat generating portion of the electric motor and the transmission so as to lubricate the heat generating portion and the transmission.

A fourteenth aspect includes, based on the first aspect, the system, wherein the electric motor is disposed in one end of the transmission, and the side cover is disposed at the opposite side of the transmission in the electric motor.

Advantageous Effects of Invention

According to the first aspect, since the side cover is formed of a resin and is insulated from the electric motor, there is no need to provide an insulating distance or a dedicated insulating member for ensuring an insulating property between the side cover and the electric motor. Thus, the size of the driving system may be decreased and the cost thereof may be suppressed by decreasing the number of components. Since the side cover is formed of a resin, the weight of the side cover may be decreased. The heat generating portion of the electric motor may be efficiently cooled by supplying a lubricant from the oil path disposed near the electric motor, and the degradation in performance of the electric motor caused by a temperature increase may be suppressed.

According to the second and third aspects, the coil of the stator as the heat generating portion of the electric motor may be cooled by ejecting the lubricant toward the upper semicircular portion of the stator from the plural ejecting holes provided in the side cover in a pinpoint manner, and the size of the lubricant pump may be decreased by decreasing the amount of the lubricant used for cooling. The coil of the lower semicircular portion of the stator is cooled by the lubricant which droops due to the own weight.

According to fourth aspect, the oil feeding path with a complex shape may be easily formed, and an effective cooling operation may be performed. Since a separate resin member is welded to the side cover, the rigidity of the side cover may be enhanced without providing plural ribs, and the weight may be further decreased.

According to the fifth and seventh aspects, the radio noise which may increase due to the resin side cover may be effectively suppressed.

According to the sixth aspect, the radio noise may be blocked in a portion which is close to the current flowing portion of the electric motor which is desired to be shielded.

According to the eighth to tenth aspects, the cooling performance for the coil of the stator using the lubricant may be improved.

According to the eleventh and twelfth aspects, the entire flow rate of the lubricant which cools the electric motor may be adjusted by the throttle valve. Thus, the degradation in welding property of the coil due to the lubricant may be suppressed, and the coil may be effectively cooled by oil-cooling and air-cooling. Meanwhile, in order to smooth in the temperature distribution in the stator, the flow rate of the lubricant of the upper portion may be set to be large, and the flow rate of the lubricant of the lower portion, of which the temperature becomes lower than the upper portion due to the heat absorption from the lubricant reservoir, may be set to be small based on the flow rate of the lubricant of the intermediate portion.

According to the thirteen aspect, the electric motor cooling operation and the transmission lubricating operation may be performed simultaneously by circulating the automatic transmission fluid which is used for two purposes for cooling the electric motor and lubricating the transmission.

According to the fourteenth aspect, the weight of the driving system may be decreased and the shape thereof may be easily processed.

DESCRIPTION OF EMBODIMENTS

Figure 1:
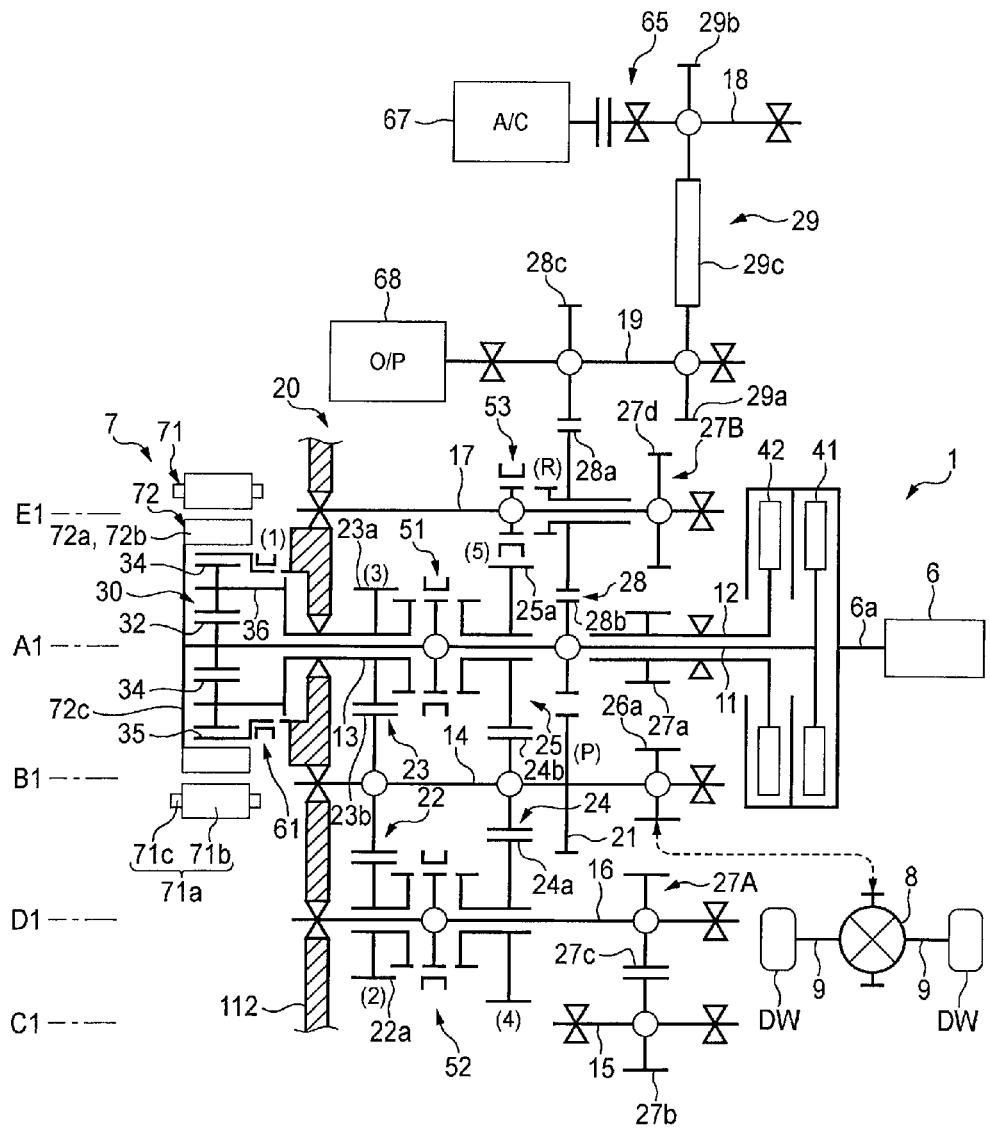
FIG. 1 is a schematic diagram illustrating a hybrid vehicle driving system of the invention.

An embodiment of an electric vehicle driving system of the invention will be described by referring to the drawings. The drawings are seen as indicated by the reference signs.

As shown in FIG. 1, a hybrid vehicle driving system 1 includes an internal combustion engine (engine) 6 which serves as a driving source, an electric motor 7, a speed changer (transmission) 20 which transmits power to driving wheels DW and DW (driving target portions), a planetary gear mechanism 30 which constitutes a part of the speed changer 20 and serves as a differential speed reducer, and a casing 80 which accommodates these components, thereby driving the driving wheels DW and DW through driving shafts 9 and 9 of a vehicle (not shown).

The casing 80 includes casings respectively formed of aluminum alloy, a clutch casing 81a which accommodates a first clutch 41 and a second clutch 42, a gear casing 81b which accommodates the speed changer 20, and a motor casing 81c which accommodates the electric motor 7, and further includes a resin side cover 82 which covers the side surface of the electric motor 7 and is fixed to the motor casing 81c. A motor chamber 110 which is formed by the motor casing 81c and the side cover 82 is separated from a gear chamber 111 which is formed by the gear casing 81b through a partition wall 112.

The engine 6 is, for example, a gasoline engine, and a crank shaft 6a of the engine 6 is equipped with the first clutch 41 and the second clutch 42 of the speed changer 20.

Figure 2:
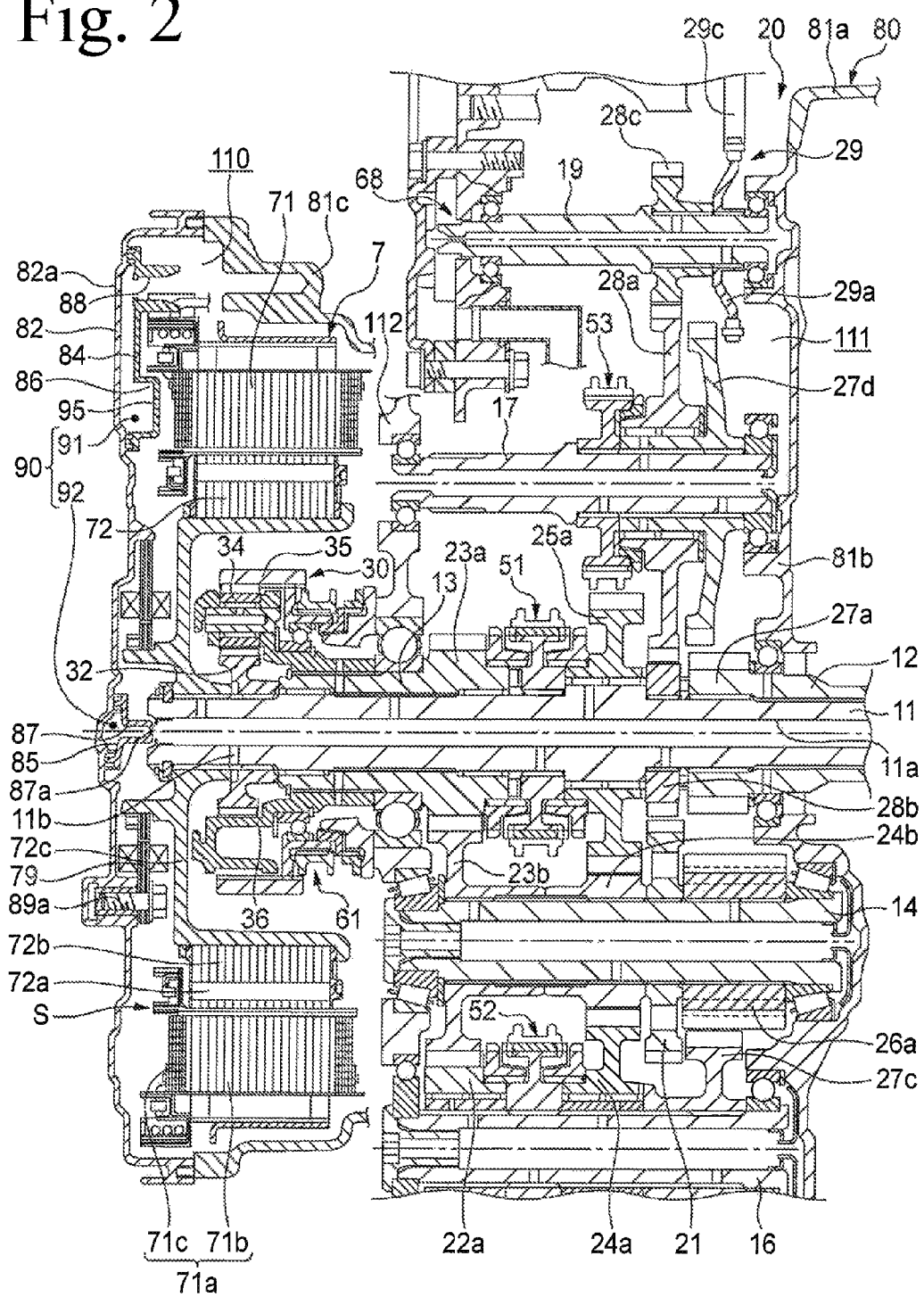
FIG. 2 is a cross-sectional view illustrating a main part of the driving system illustrated in FIG. 1.

Also, as shown in FIG. 2, the electric motor 7 is a three-phase brushless DC motor, and includes a stator 71 that has $3n$ armatures 71a and a rotor 72 that is disposed so as to face the stator 71. Each armature 71a includes an iron core 71b and a coil 71c that is wound around the iron core 71b, and is fixed to the casing 80. The respective armatures are circumferentially arranged about the rotation shaft at substantially the same intervals. The $3n$ coils 71c form a three-phase coil with n pairs of U-phases, V-phases, and W-phases.

The rotor 72 includes n permanent magnets 72a which are arranged about the rotation shaft at substantially the same intervals, and the polarities of two adjacent permanent magnets 72a are different from each other. A fixation portion 72c which fixes a rotor yoke 72b used to hold the respective permanent magnets 72a is formed of soft ferrite (for example, iron) so as to have a hollow cylindrical shape, is disposed on the outer peripheral side of a ring gear 35 of a planetary gear mechanism 30 to be described later, and is connected to a sun gear 32 of the planetary gear mechanism 30. Accordingly, the rotor 72 is configured to rotate along with the sun gear 32 of the planetary gear mechanism 30.

The planetary gear mechanism 30 includes the sun gear 32, the ring gear 35 which is disposed coaxial with the sun gear 32 and is disposed so as to surround the periphery of the sun gear 32, planetary gears 34 which mesh with the sun gear 32 and the ring gear 35, and a carrier 36 which supports the planetary gears 34 so that each planetary gear 34 respectively rotates and all the planetary gears 34 collectively revolve. In this way, the sun gear 32, the ring gear 35, and the carrier 36 are configured to be differentially rotatable relative to each other.

The ring gear 35 is equipped with a synchronizing and locking mechanism 61 (locking mechanism) that includes a synchronizing mechanism (synchronizer mechanism) and is configured to stop (lock) the rotation of the ring gear 35.

The speed changer 20 is a so-called twin clutch type speed changer that includes the first clutch 41, the second clutch 42, the planetary gear mechanism 30, and plural speed changing gear trains.

The speed changer 20 includes a first main shaft 11 which is disposed coaxial with the crank shaft 6a of the engine 6 (on a rotation axis A1), a second main shaft 12, a connection shaft 13, a counter shaft 14 that is rotatable about a rotation axis B1 disposed in parallel to the rotation axis A1, a first intermediate shaft 15 that is rotatable about a rotation axis C1 disposed in parallel to the rotation axis A1, a second intermediate shaft 16 that is rotatable about a rotation axis D1 disposed in parallel to the rotation axis A1, and a reverse shaft 17 that is rotatable about a rotation axis E1 disposed in parallel to the rotation axis A1.

In the first main shaft 11, the first clutch 41 is provided on the side of the engine 6, and the sun gear 32 of the planetary gear mechanism 30 and the rotor 72 of the electric motor 7 are attached to the opposite side of the engine 6. Accordingly, the first main shaft 11 is selectively connected to the crank shaft 6a of the engine 6 and is directly connected to the electric motor 7 by the first clutch 41, and hence the power of the engine 6 and/or the electric motor 7 is transmitted to the sun gear 32.

The second main shaft 12 is formed in a hollow shape being shorter than the first main shaft 11, and is rotatably disposed on cover the periphery of the first main shaft 11 on the side of the engine 6. In the second main shaft 12, the second clutch 42 is provided on the side of the engine 6, and an idle driving gear 27a is integrally attached to the opposite side of the engine 6. Accordingly, the second main shaft 12 is selectively connected to the crank shaft 6a of the engine 6 by the second clutch 42, and hence the power of the engine 6 is transmitted to the idle driving gear 27a.

The connection shaft 13 is formed in a hollow shape being shorter than the first main shaft 11, and is rotatably disposed on the periphery of the first main shaft 11 on the opposite side of the engine 6. In the connection shaft 13, a third-speed driving gear 23a is integrally attached to the side of the engine 6, and the carrier 36 of the planetary gear mechanism 30 is rotatably and integrally attached to the opposite side of the engine 6. Accordingly, the carrier 36 and the third-speed driving gear 23a which are attached to the connection shaft 13 are configured to rotate together by the revolution of the planetary gears 34.

In the first main shaft 11, a fifth-speed driving gear 25a is provided between the third-speed driving gear 23a attached to the connection shaft 13 and the idle driving gear 27a attached to the second main shaft 12 so as to be rotatable relative to the first main shaft 11, and a reverse driven gear 28b is attached thereto so as to rotate along with the first main shaft 11. A first speed changing shifter 51 is provided between the third-speed driving gear 23a and the fifth-speed driving gear 25a so as to connect the first main shaft 11 to the third-speed driving gear 23a or the fifth-speed driving gear 25a or release the connection therebetween.

When the first speed changing shifter 51 is shifted to a third-speed connection position, the first main shaft 11 and the third-speed driving gear 23a are connected to rotate together. When the first speed changing shifter is shifted to a fifth-speed connection position, the first main shaft 11 and the fifth-speed driving gear 25a rotate together. When the first speed changing shifter 51 is in a neutral position, the first main shaft 11 rotates relative to the third-speed driving gear 23a and the fifth-speed driving gear 25a. When the first main shaft 11 and the third-speed driving gear 23a rotate together, the planetary gear mechanism 30 integrally rotates such that the sun gear 32 attached to the first main shaft 11 and the carrier 36 connected to the third-speed driving gear 23a through the connection shaft 13 rotate together, and the ring gear 35 also rotates.

A first idle driven gear 27b, which meshes with the idle driving gear 27a attached to the second main shaft 12, is attached to the first intermediate shaft 15.

A second idle driven gear 27c, which meshes with the first idle driven gear 27b attached to the first intermediate shaft 15, is attached to the second intermediate shaft 16 so as to be rotatable together. The second idle driven gear 27*c* constitute a first idle gear train 27A together with the idle driving gear 27*a* and the first idle driven gear 27*b*. In the second intermediate shaft 16, a second-speed driving gear 22*a* and a fourth-speed driving gear 24*a* which are rotatable relative to the second intermediate shaft 16 are respectively provided at positions where they correspond to the third-speed driving gear 23*a* and the fifth-speed driving gear 25*a* which are provided in the periphery of the first main shaft 11. In the second intermediate shaft 16, a second speed changing shifter 52 is provided between the second-speed driving gear 22*a* and the fourth-speed driving gear 24*a* so as to connect the second intermediate shaft 16 to the second-speed driving gear 22*a* or the fourth-speed driving gear 24*a* or release the connection therebetween.

When the second speed changing shifter 52 is shifted to a second-speed connection position, the second intermediate shaft 16 and the second-speed driving gear 22*a* rotate together. When the second speed changing shifter 52 is shifted to a fourth-speed connection position, the second intermediate shaft 16 and the fourth-speed driving gear 24*a* rotate together. When the second speed changing shifter 52 is at a neutral position, the second intermediate shaft 16 rotates relative to the second-speed driving gear 22*a* and the fourth-speed driving gear 24*a*.

A first common driven gear 23*b*, a second common driven gear 24*b*, a parking gear 21, and a final gear 26*a* are attached to the counter shaft 14 in this order from the opposite side of the engine 6 so as to be rotatable together.

The first common driven gear 23*b* meshes with the third-speed driving gear 23*a* attached to the connection shaft 13 so as to constitute a third-speed gear train 23 together with the third-speed driving gear 23*a*, and meshes with the second-speed driving gear 22*a* provided in the second intermediate shaft 16 so as to constitute a second-speed gear train 22 together with the second-speed driving gear 22*a*.

The second common driven gear 24*b* meshes with the fifth-speed driving gear 25*a* provided in the first main shaft 11 so as to constitute a fifth-speed gear train 25 together with the fifth-speed driving gear 25*a*, and meshes with the fourth-speed driving gear 24*a* provided in the second intermediate shaft 16 so as to constitute a fourth-speed gear train 24 together with the fourth-speed driving gear 24*a*.

The final gear 26*a* meshes with a differential gear mechanism 8, and the differential gear mechanism 8 is connected to the driving wheels DW and DW through the driving shafts 9 and 9. Accordingly, the power which is transmitted to the counter shaft 14 is output from the final gear 26*a* to the differential gear mechanism 8, the driving shafts 9 and 9, and the driving wheels DW and DW.

A third idle driven gear 27*d*, which meshes with the first idle driven gear 27*b* attached to the first intermediate shaft 15, is attached to the reverse shaft 17 so as to be rotatable together. The third idle driven gear 27*d* constitute a second idle gear train 27B together with the idle driving gear 27*a* and the first idle driven gear 27*b*. A reverse driving gear 28*a*, which meshes with the reverse driven gear 28*b* attached to the first main shaft 11, is provided in the reverse shaft 17 so as to be rotatable relative to the reverse shaft 17. The reverse driving gear 28*a* constitutes a reverse gear train 28 together with the reverse driven gear 28*b*. A reverse shifter 53 is provided in the reverse driving gear 28*a* on the opposite side of the engine 6 so as to connect the reverse shaft 17 to the reverse driving gear 28*a* or release the connection therebetween.

When the reverse shifter 53 is shifted to a reverse connection position, the reverse shaft 17 and the reverse driving gear 28*a* rotate together. When the reverse shifter 53 is at a neutral position, the reverse shaft 17 and the reverse driving gear 28*a* rotate relative to each other.

The first speed changing shifter 51, the second speed changing shifter 52, and the reverse shifter 53 use a clutch mechanism equipped with a synchronizing mechanism (synchronizer mechanism) that equalizes the rotation speeds of the shaft and the gear to be connected to each other.

In the speed changer 20, an odd-numbered gear group (first gear group) which includes the third-speed driving gear 23*a* and the fifth-speed driving gear 25*a* is provided on the first main shaft 11 which is one of two speed changing shafts. An even-numbered gear group (second gear group) which includes the second-speed driving gear 22*a* and the fourth-speed driving gear 24*a* is provided on the second intermediate shaft 16 which is the other of the two speed changing shafts.

The vehicle driving system 1 further includes an air compressor 67 and an oil pump 68. The oil pump 68 is attached onto an oil pump auxiliary machine shaft 19 disposed in parallel to the rotation axes A1 to E1 so as to be rotatable along with the oil pump auxiliary machine shaft 19. An oil pump driven gear 28*c* which meshes with the reverse driving gear 28*a* and an A/C driving gear 29*a* are attached to the oil pump auxiliary machine shaft 19 so as to be rotatable together, and the power of the engine 6 and/or the electric motor 7 which rotates the first main shaft 11 is transmitted thereto. The air compressor 67 is provided on the A/C auxiliary machine shaft 18 disposed in parallel to the rotation axes A1 to E1 through the A/C clutch 65. An A/C driven gear 29*b* to which power is transmitted from the A/C driving gear 29*a* through a chain 29*c* is provided in the A/C auxiliary machine shaft 18 so as to be rotatable along with the A/C auxiliary machine shaft 18, and the power of the engine 6 and/or the electric motor 7 is transmitted thereto from the oil pump auxiliary machine shaft 19 through an A/C transfer mechanism 29 which includes the A/C driving gear 29*a*, the chain 29*c*, and the A/C driven gear 29*b*. The air compressor 67 is configured to interrupt the transmission of power by performing connection and disconnection of the A/C clutch 65 through an A/C operating solenoid (not shown).

With the above-described configuration, the hybrid vehicle driving system 1 of the embodiment has first to fifth transmission paths as below.

(1) In a first transmission path, the crank shaft 6*a* of the engine 6 is connected to the driving wheels DW and DW through the first main shaft 11, the planetary gear mechanism 30, the connection shaft 13, the third-speed gear train 23 (the third-speed driving gear 23*a* and the first common driven gear 23*b*), the counter shaft 14, the final gear 26*a*, the differential gear mechanism 8, and the driving shafts 9 and 9. The speed reduction ratio of the planetary gear mechanism 30 is set so that the engine torque transmitted to the driving wheels DW and DW through the first transmission path corresponds to a first speed. That is, the speed reduction ratio through the speed reduction ratio of the planetary gear mechanism 30 and the speed reduction ratio of the third-speed gear train 23 is set so as to correspond to the first speed. In a state where first clutch 41 is fastened through the first transmission path, a first-speed traveling mode is performed when the synchronizing and locking mechanism 61 is locked and the first speed changing shifter 51 is made to be neutral.

(2) In a second transmission path, the crank shaft 6*a* of the engine 6 is connected to the driving wheels DW and DW through the second main shaft 12, the first idle gear train 27A (the idle driving gear 27*a*, the first idle driven gear 27*b*, and the second idle driven gear 27*c*), the second intermediate shaft 16, the second-speed gear train 22 (the second-speed driving gear 22a and the first common driven gear 23b) or the fourth-speed gear train 24 (the fourth-speed driving gear 24a and the second common driven gear 24b), the counter shaft 14, the final gear 26a, the differential gear mechanism 8, the driving shafts 9, and 9. In a state where the second clutch 42 is fastened through the second transmission path, a second-speed traveling mode is performed when the second speed changing shifter 52 is shifted to the second-speed connection position, and a fourth-speed traveling mode is performed when the second speed changing shifter 52 is shifted to the fourth-speed connection position.

(3) In a third transmission path, the crank shaft 6a of the engine 6 is connected to the driving wheels DW and DW through the first main shaft 11, the third-speed gear train 23 (the third-speed driving gear 23a and the first common driven gear 23b) or the fifth-speed gear train 25 (the fifth-speed driving gear 25a and the second common driven gear 24b), the counter shaft 14, the final gear 26a, the differential gear mechanism 8, and the driving shafts 9 and 9 without using the planetary gear mechanism 30. In the state where the first clutch 41 is fastened through the third transmission path, a third-speed traveling mode is performed when the first speed changing shifter 51 is shifted to the third-speed connection position, and a fifth-speed traveling mode is performed when the first speed changing shifter 51 is shifted to the fifth-speed connection position.

(4) In a fourth transmission path, the electric motor 7 is connected to the driving wheels DW and DW through the planetary gear mechanism 30 or the third-speed gear train 23 (the third-speed driving gear 23a and the first common driven gear 23b) or the fifth-speed gear train 25 (the fifth-speed driving gear 25a and the second common driven gear 24b), the counter shaft 14, the final gear 26a, the differential gear mechanism 8, the driving shafts 9, and 9. In a state where the first and second clutches 41 and 42 are interrupted through the fourth transmission path, a first-speed EV traveling mode is performed when the synchronizing and locking mechanism 61 is locked and the first speed changing shifter 51 is made to be neutral, a third-speed EV traveling mode is performed when the locking of the synchronizing and locking mechanism 61 is released and the first speed changing shifter 51 is shifted to the third connection position, and a fifth-speed EV traveling mode is performed when the locking of the synchronizing and locking mechanism 61 is released and the first speed changing shifter 51 is shifted to the fifth connection position.

(5) In a fifth transmission path, the crank shaft 6a of the engine 6 is connected to the driving wheels DW and DW through the second main shaft 12, the second idle gear train 27B (the idle driving gear 27a, the first idle driven gear 27b, and the third idle driven gear 27d), the reverse shaft 17, the reverse gear train 28 (the reverse driving gear 28a and the reverse driven gear 28b), the planetary gear mechanism 30, the connection shaft 13, the third-speed gear train 23 (the third-speed driving gear 23a and the first common driven gear 23b), the counter shaft 14, the final gear 26a, the differential gear mechanism 8, and the driving shafts 9 and 9. In a state where the second clutch 42 is fastened through the fifth transmission path, a reverse traveling mode is performed when the reverse shifter 53 is shifted to the reverse connection position.

The electric motor 7 is connected to a battery through a power control unit which controls the operation thereof. The power control unit controls power supply from the battery to the electric motor 7 and regeneration of energy to the battery. That is, the electric motor is driven by the power which is supplied from the battery through the power control unit, and charges the battery through the rotation of the driving wheels DW and DW or the regeneration of the engine 6 during a speed reducing traveling mode. The power control unit is connected to an electric control unit which is a controller that performs various controls of the entire vehicle. The electric control unit is a controller that performs various controls of the entire vehicle, and the electric control unit receives a speed increasing command, a braking command, an engine rpm, a motor rpm, the rpm of the first and second main shafts 11 and 12, the rpm of the counter shaft 14 and the like, a vehicle speed, a shift position, an SOC, and the like. On the other hand, the electric control unit outputs a signal of controlling the engine 6, a signal of controlling the electric motor 7, a signal representing a generating state, a charged state, a discharged state, and the like of the battery, a signal of controlling the first and second speed changing shifters 51 and 52, a signal of controlling the reverse shifter 53, a signal of controlling the locking of the synchronizing and locking mechanism 61, a signal of controlling an A/C operating solenoid (not shown), a signal of controlling the throttle valve 95a to be described later, and the like.

The hybrid vehicle driving system 1 with this configuration may perform the first-speed traveling mode to the fifth-speed traveling mode and the reverse traveling mode using the engine 6 by controlling the connection and the disconnection of the first and second clutches 41 and 42 and controlling the connection positions of the first speed changing shifter 51, the second speed changing shifter 52, and the reverse shifter 53. In the engine traveling mode, the driving system may assist the engine or perform regeneration using the electric motor 7. Also, the driving system may perform the EV traveling mode. In an idling mode, the driving system may start the engine 6 using the electric motor 7 or charge the battery.

As shown in FIG. 2, the electric motor 7 which includes the stator 71 and the rotor 72 is disposed at the end portion (the left end portion in the drawing) on the opposite side of the engine 6 in the first main shaft 11. An oil feeding hole 11a which extends in the axial direction is formed at the center of the first main shaft 11, and oil is supplied from the oil feeding hole 11a to the respective units of the speed changer 20 by plural oil feeding holes 11b which extend in the radial direction. The rotor 72 fixed to the first main shaft 11 and the stator 71 facing the outer periphery of the rotor 72 are accommodated in the casing 80 together with the speed changer 20.

Figure 3:
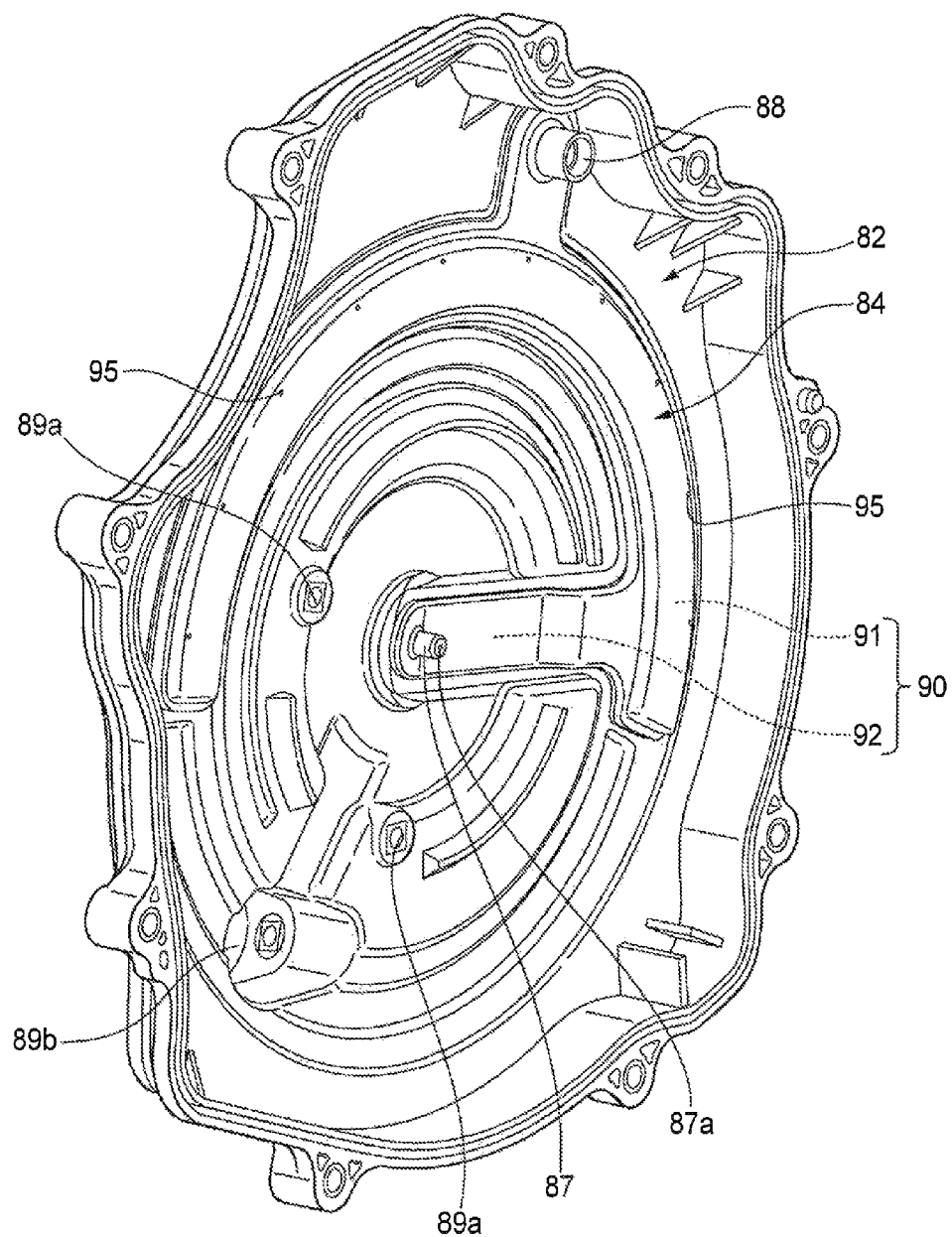
FIG. 3 is a perspective view of a side cover illustrated in FIG. 2 as seen from the inner side.
Figure 4B:
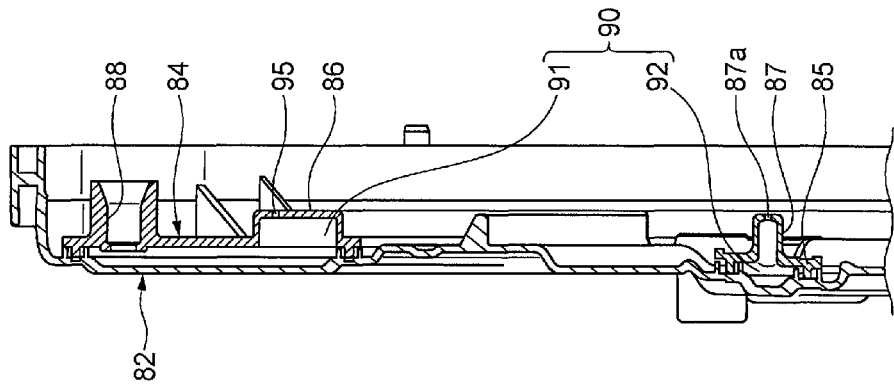
FIG. 4(b) is a cross-sectional view taken along the line of IV-IV.
Figure 4A:
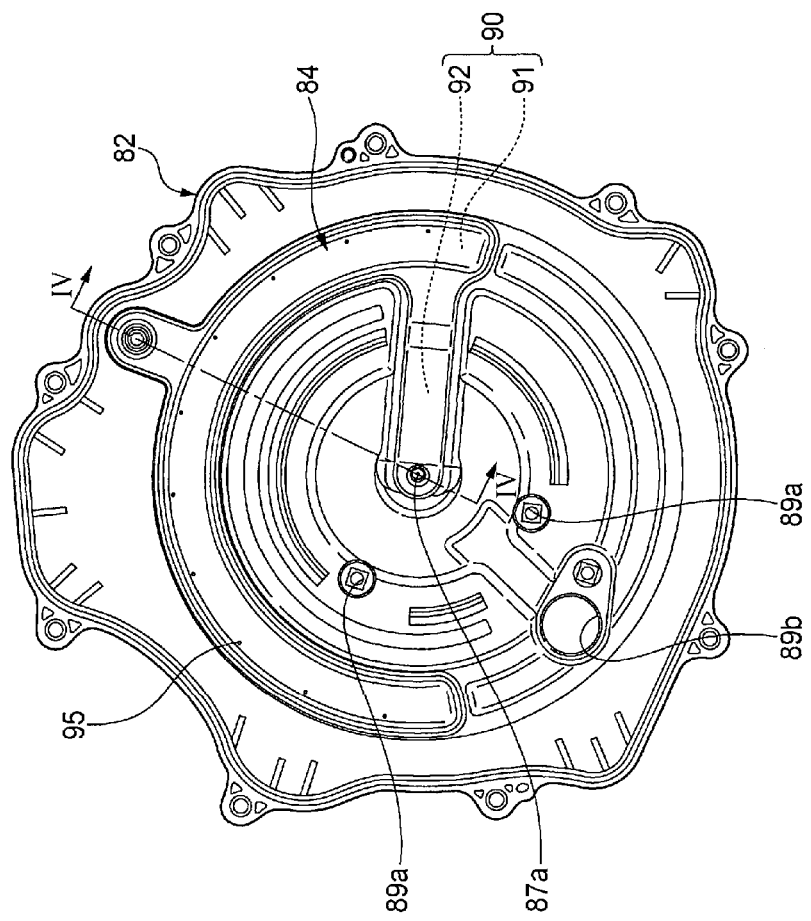
FIG. 4(a) is a front view illustrating the inner side of the side cover.

That is, the speed changer 20 and the outer periphery of the planetary gear mechanism 30 are covered by a gear casing 81b. The outer periphery of the electric motor 7 is covered by a motor casing 81c. The side surface portion of the electric motor 7 is covered by the resin side cover 82 which is fixed to the side surface (the left side surface) of the motor casing 81c. Referring to FIGS. 3 and 4, the oil path forming member 84 which is a separate resin member is welded to the inner surface of the side cover 82, and an oil path 90 which supplies lubricant is formed inside the side cover 82.

The oil path forming member 84 includes a radial extension portion 85 which extends outward from in the radial direction the center portion, a substantially semicircular plate portion 86 which is formed in a substantially semicircular shape from the outer end portion of the radial extension portion 85, an axial extension portion 87 which extends in the axial direction from the center portion of the radial extension portion 85 and is provided with the lubricant supplying hole 87a, and a hole 88 which extends outward in the radial direction from the intermediate portion of the substantially semicircular plate portion 86 so as to insert a feeding pipe 113 (see FIG. 9) used for supplying a lubricant to the oil path 90.

Figure 5:
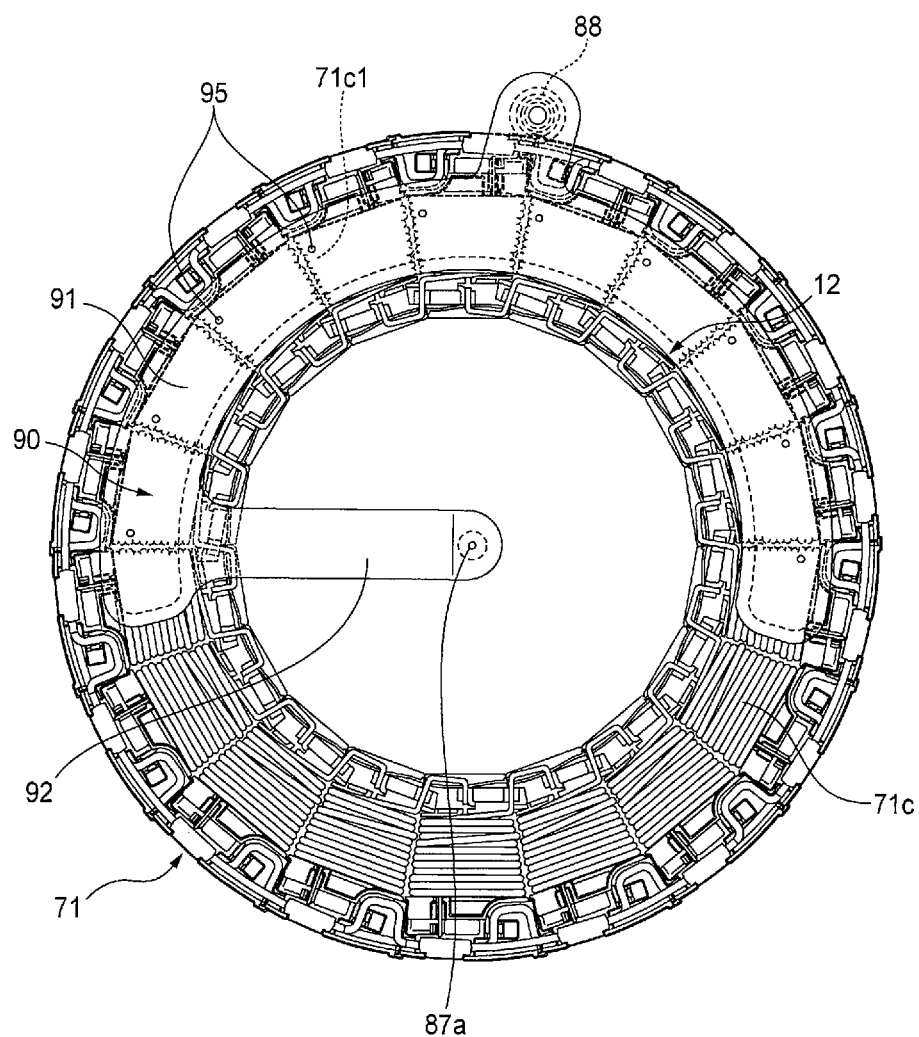
FIG. 5 is a front view illustrating the positional relationship between plural ejecting holes of the side cover and a coil of an electric motor.

The radial extension portion 85 extends in the radial direction from the center portion so as not to interfere with a bolt fastening hole 89a which is used to fix a resolver 79 thereto and a sensor hole 89b which is used to attach a temperature sensor (not shown) that faces the stator 71 and detects the temperature of the stator 71. The substantially semicircular plate portion 86 has a radial dimension in which it faces the upper semicircular portion of the substantially annular stator 71, and plural ejecting holes 95 are circumferentially arranged correspondingly with plural salient-pole-concentrated-winding coils 71c at intervals. In particular, the salient-pole-concentrated-winding coil 71c is wound on a substantially rectangular insulator body. As shown in FIG. 5, the plural ejecting holes 95 are arranged so that lubricant is ejected toward radial center portions 71c1 of bending portions of the salient-pole-concentrated-winding coils 71c. The lubricant supplying hole 87a which is provided in the axial extension portion 87 communicates with the oil feeding hole 11a of the first main shaft 11.

When the oil path forming member 84 is welded to the inner surface of the side cover 82, a radial oil feeding path 92 is formed by a space which is defined by the inner surface of the radial extension portion 85 and the inner surface of the side cover 82. A substantially semicircular oil feeding path 91 is formed by a space which is defined by the inner surface of the substantially semicircular plate portion 86 and the inner surface of the side cover 82. The oil path 90 is formed by the substantially semicircular oil feeding path 91 and the radial oil feeding path 92 which communicate with each other.

Metal plating is performed on an outer surface 82a of the side cover 82. Accordingly, it is possible to suppress an increasing radio noise which may be generated when the side cover 82 is formed of resin.

Figure 8:
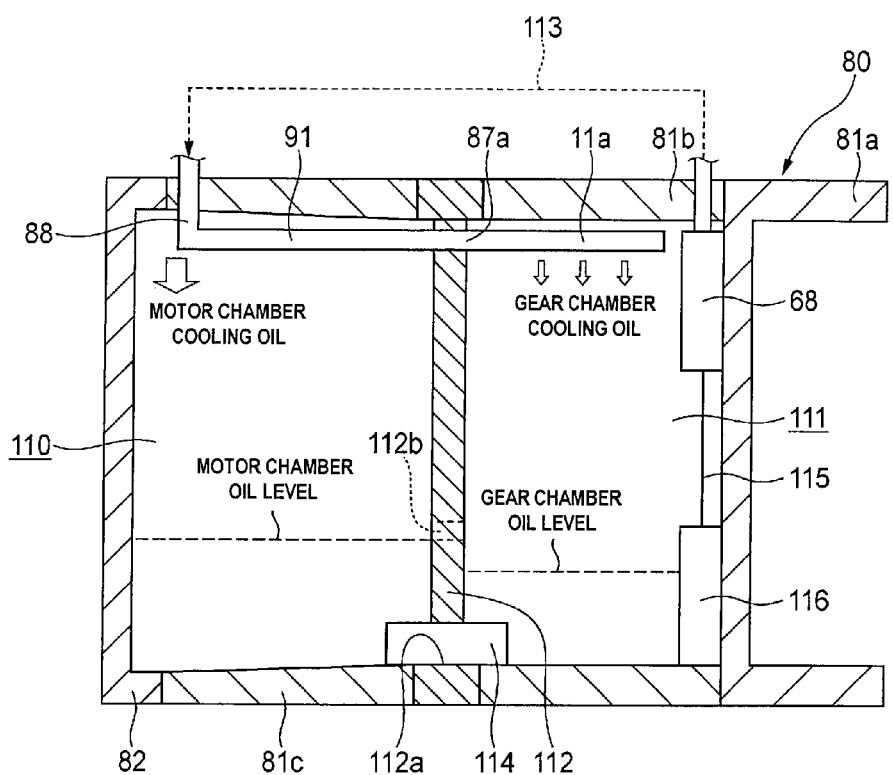
FIG. 8 is a schematic diagram illustrating a lubricating mechanism of the vehicle driving system.

FIG. 8 schematically illustrates the lubricating mechanism of the vehicle driving system. In the partition wall 112 which separates the motor chamber 110 and the gear chamber 111 from each other, a communication hole 112a which communicates the motor chamber 110 and the gear chamber 111 with each other is formed at the lower end of the center portion thereof, and an oil level adjusting hole 112b is formed above the communication hole 112a. The lower edge of the oil level adjusting hole 112b is positioned at the radial outer side and the lower side of an air gap S (see FIG. 2) which is formed between the stator 71 and the rotor 72 arranged to face each other, so that the oil level of the lubricant stored in the motor chamber 110 is prevented from exceeding the air gap S, thereby suppressing the lubricant from serving as the friction of the rotor 72.

The communication hole 112a is provided with a solenoid valve 114 which is controlled by the electric control unit so as to be opened and closed. A lubricant path 115 which supplies a lubricant to the gear chamber 111 and serves as a cooling oil path supplying a lubricant to the motor chamber 110 extends from the downside of the gear chamber 111 to the oil pump 68. In the embodiment, as the lubricant and the cooling oil, the same automatic transmission fluid is used. The lubricant which is mainly supplied for lubricating and the lubricant which is mainly supplied for cooling are both called the lubricant.

In the lubricant path 115, the oil pump 68 is provided at the downstream side, and a strainer 116 is provided at the upstream side. Iron piece which is contained in the lubricant pumped-up by the oil pump 68 is collected by the strainer 116. The feeding pipe 113 is connected to the downstream of the oil pump 68.

Figure 9:
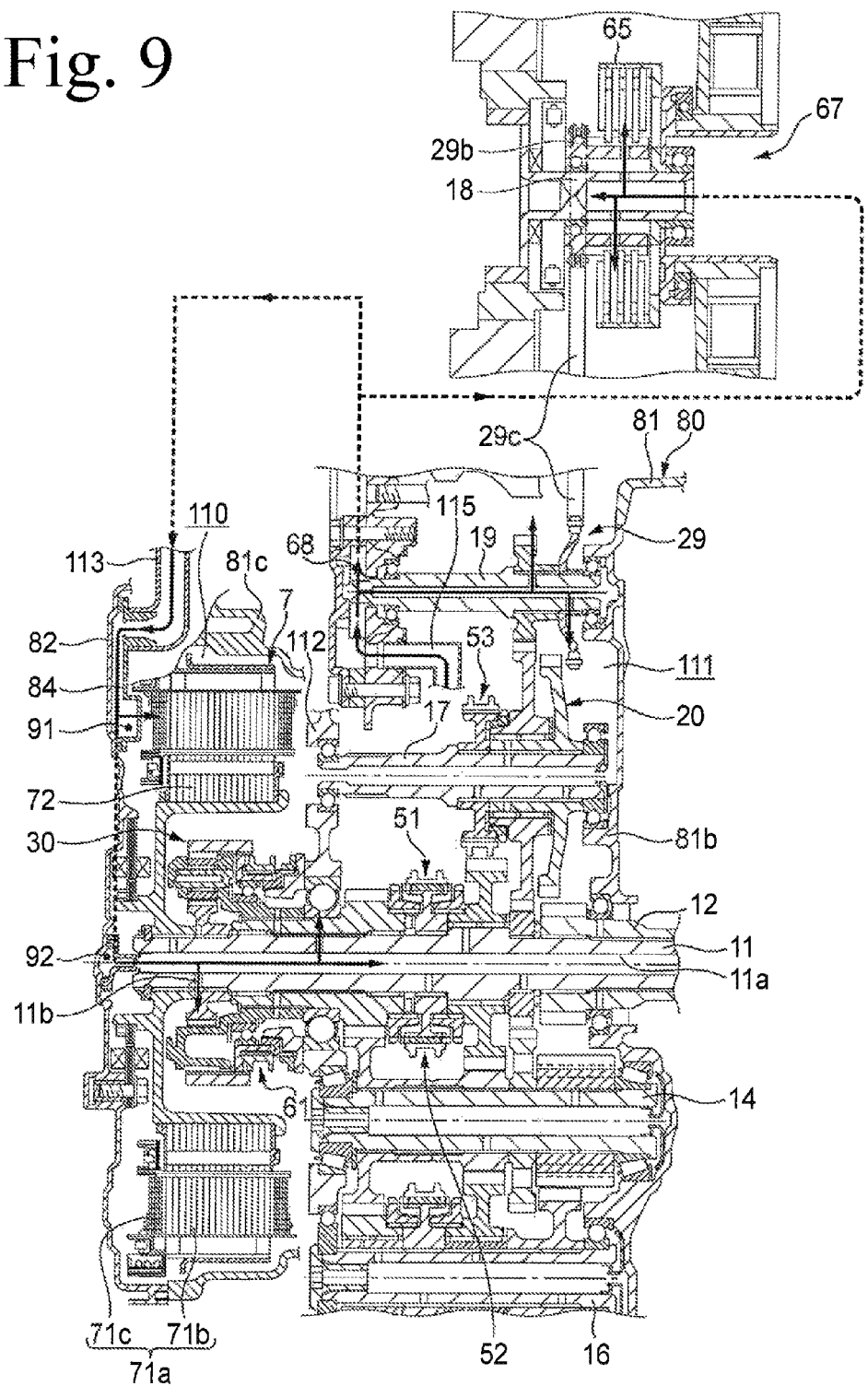
FIG. 9 is a cross-sectional view illustrating the flow of a lubricant in the driving system.

Next, the effect of the embodiment with the above-described configuration will be described. As shown in FIG. 9, the oil pump 68 is driven when the vehicle travels or stops since it rotates while being synchronized with the first main shaft 11.

The lubricant which is pumped up by the oil pump 68 is supplied so as to be distributed to the respective units of the speed changer 20 inside the gear chamber 111 and the air compressor 67, specifically, the A/C clutch 65, and is supplied so as to be distributed to the motor chamber 110.

The lubricant which is supplied to the motor chamber 110 through the feeding pipe 113 is supplied from the hole 88 formed in the side cover 82 to the oil path 90, and is ejected from the plural ejecting holes 95 of the substantially semicircular oil feeding path 91 toward the upper semicircular portion of the stator 71. Since the plural ejecting holes 95 are arranged so that the lubricant is ejected toward the radial center portions 71c1 of the bending portions of the salient-pole-concentrated-winding coils 71c of the stator 71, the cooling performance may be improved compared to the case where the lubricant is ejected toward the radial center portions of the circumferential intermediate portions of the coils 71c. With regard to the plural ejecting holes 95, since the number of ejecting holes 95 is limited so as to correspond to the upper semicircular portion of the stator 71, the cooling lubricant ejecting amount may be decreased and the size of the lubricant pump may be decreased by decreasing the pump capacity.

The lubricant which directly cools the coil 71c of the upper semicircular portion of the stator 71 drops along the stator 71 due to the own weight, and also cools the coil 71c of the lower semicircular portion of the stator 71. Subsequently, the lubricant which cools the coil 71c is accumulated in the lubricant reservoir of the lower portion of the motor chamber 110 of the casing due to the own weight, and is sent to the lubricant reservoir of the gear chamber 111 through the oil level adjusting hole 112b or the opening of the solenoid valve 114.

The lubricant which is supplied to the oil path 90 formed in the side cover 82 and flows from the substantially semicircular oil feeding path 91 in the radial oil feeding path 92 is supplied to the oil feeding hole 11a of the first main shaft 11 through the lubricant supplying hole 87a. Thus, the respective units of the speed changer 20 are lubricated by the lubricant which is ejected from the oil feeding hole 11b of the first main shaft 11 as well as the respective units of the speed changer 20 are lubricated also by pumping the lubricant of the lubricant reservoir of the gear chamber 111 up. The lubricant of the lubricant reservoir of the gear chamber 111 is pumped up by the oil pump 68 so as to circulate as described above.

In this way, the coil 71c which is a main heat generating portion of the electric motor 7 is effectively cooled by the lubricant, so that efficiency decrease of the electric motor 7 is prevented due to a temperature increase. Since the side cover 82 is formed of a resin with an insulating property, the side cover may be disposed near the electric motor 7 while ensuring the insulating property against the electric motor 7, and the size of the driving system 1 may be decreased.

According to the above-described hybrid vehicle driving system 1 of the embodiment, since the side cover 82 which forms a part of the casing 80 and covers the side surface portion of the electric motor 7 is formed of a resin, the resin side cover 82 and the electric motor 7 are insulated from each other. Accordingly, an insulating distance or a dedicated insulating member does not need to be provided between both members 82 and 7 so as to ensure the insulating property therebetween. Thus, the size of the driving system 1 may be decreased and the cost thereof may be suppressed by decreasing the number of components. Since the side cover 82 is formed of a resin, the weight of the side cover may be largely decreased compared to the existing side cover formed of aluminum alloy, which contributes to the efficiency improvement of the vehicle.

Since the side cover 82 includes the oil path 90 provided with the plural ejecting holes 95 that eject the lubricant to the heat generating portion of the electric motor 7, the lubricant may be ejected from the ejecting holes 95 of the oil path 90 disposed near the electric motor 7 so as to efficiently cool the electric motor, and degradation in performance of the electric motor 7 may be suppressed due to a temperature increase.

The heat generating portion of the electric motor 7 is the plural coils 71c of the stator 71, and the oil path 90 provided in the side cover 82 includes the radial oil feeding path 92 which is formed in the radial direction from the center of the side cover 82 and the substantially semicircular oil feeding path 91 which corresponds to the upper semicircular portion of the stator 71. The substantially semicircular oil feeding path 91 is provided with the plural ejecting holes 95. Accordingly, the coil 71c of the stator 71 may be effectively cooled by ejecting the lubricant from the ejecting holes 95 to the stator 71 of the electric motor 7 in a pinpoint manner. Accordingly, the size of the lubricant pump may be decreased by decreasing the amount of the lubricant used for cooling. The coil 71c of the lower semicircular portion of the stator 71 is cooled by the lubricant which droops due to the own weight.

Since the plural ejecting holes 95 are arranged so that the lubricant is ejected toward the radial center portions 71c1 of the bending portions of the salient-pole-concentrated-winding coils 71c of the stator 71, the cooling performance may be improved compared to the case where the lubricant is ejected toward the radial center portions of the circumferential intermediate portions of the coils 71c.

Since the oil path 90 is formed inside the side cover 82 by welding the oil path forming member 84 as a separate resin member, the oil path 90 which has a complex shape may be also easily formed, and the oil path 90 which is effective for cooling may be formed. By the welding of the oil path forming member 84, the rigidity of the side cover 82 may be enhanced without providing plural ribs, and the weight of the side cover may be further decreased.

Figure 6B:
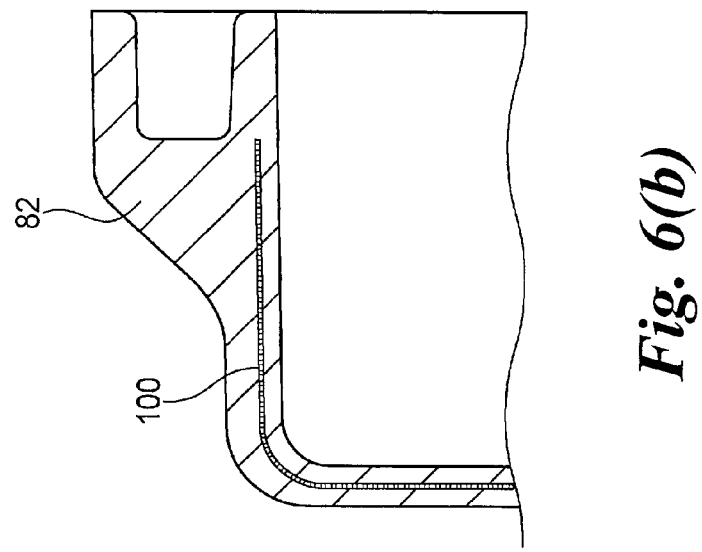
FIG. 6(b) is a cross-sectional view.
Figure 6A:
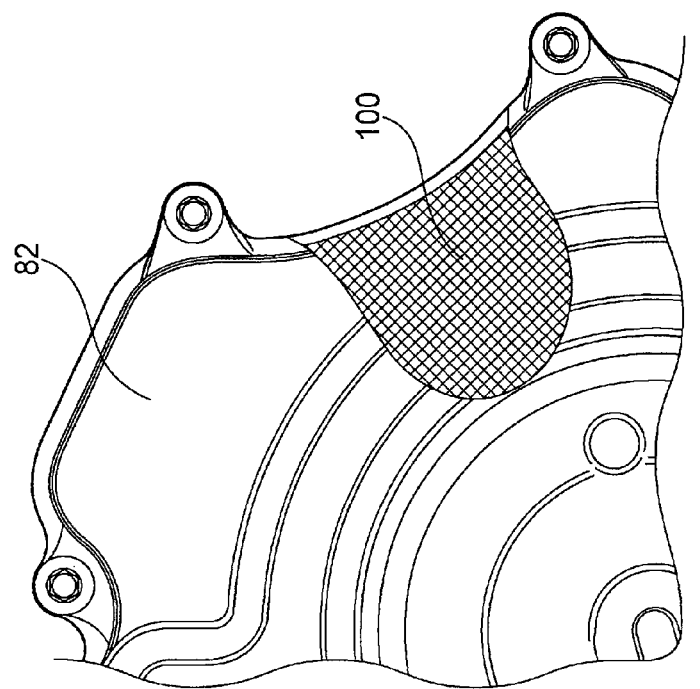
FIG. 6(a) is a partially cut-away diagram illustrating the side cover.
Figure 7:
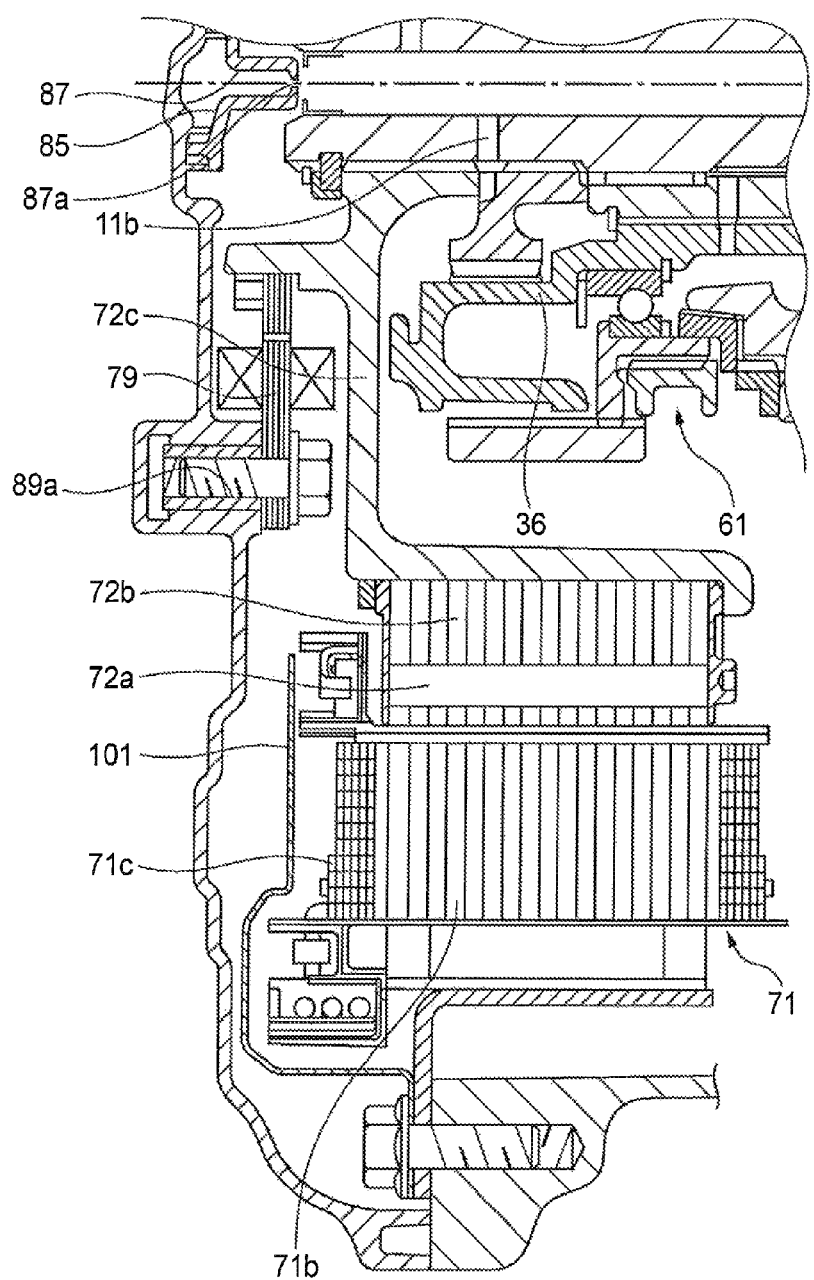
FIG. 7 is a partially cross-sectional view illustrating a driving system that includes a motor-current-flowing-portion shielding material.

Since metal plating is performed on the outer surface 82a of the side cover 82, radio noise which may increase due to the resin side cover 82 may be effectively suppressed. Instead of the metal plating, as shown in FIG. 6, a metallic member such as a metal mesh 100 may be disposed by insert-molding in the side cover 82 so as to cover the entire surface thereof. As shown in FIG. 7, a motor-current-flowing-portion shielding material 101 which is formed of an SP material or the like may be disposed while maintaining an insulating distance between the resin side cover 82 and the stator 71. The motor-current-flowing-portion shielding material 101 may be disposed so as to cover the entire surface of the stator 71 or may be disposed in a part thereof.

The lubricant which is accumulated in the lubricant reservoir of the lower portion of the casing is pumped up by the oil pump 68, and is supplied so as to be distributed to the air compressor 67 and the oil path 90. The lubricant which is supplied to the oil path 90 is supplied so as to be distributed to the heat generating portion of the electric motor 7 and the speed changer 20. Accordingly, ATF may be commonly used so as to cool the oil pump 68, the electric motor 7, and the speed changer 20, and a separate device does not need to be provided.

Figure 10:
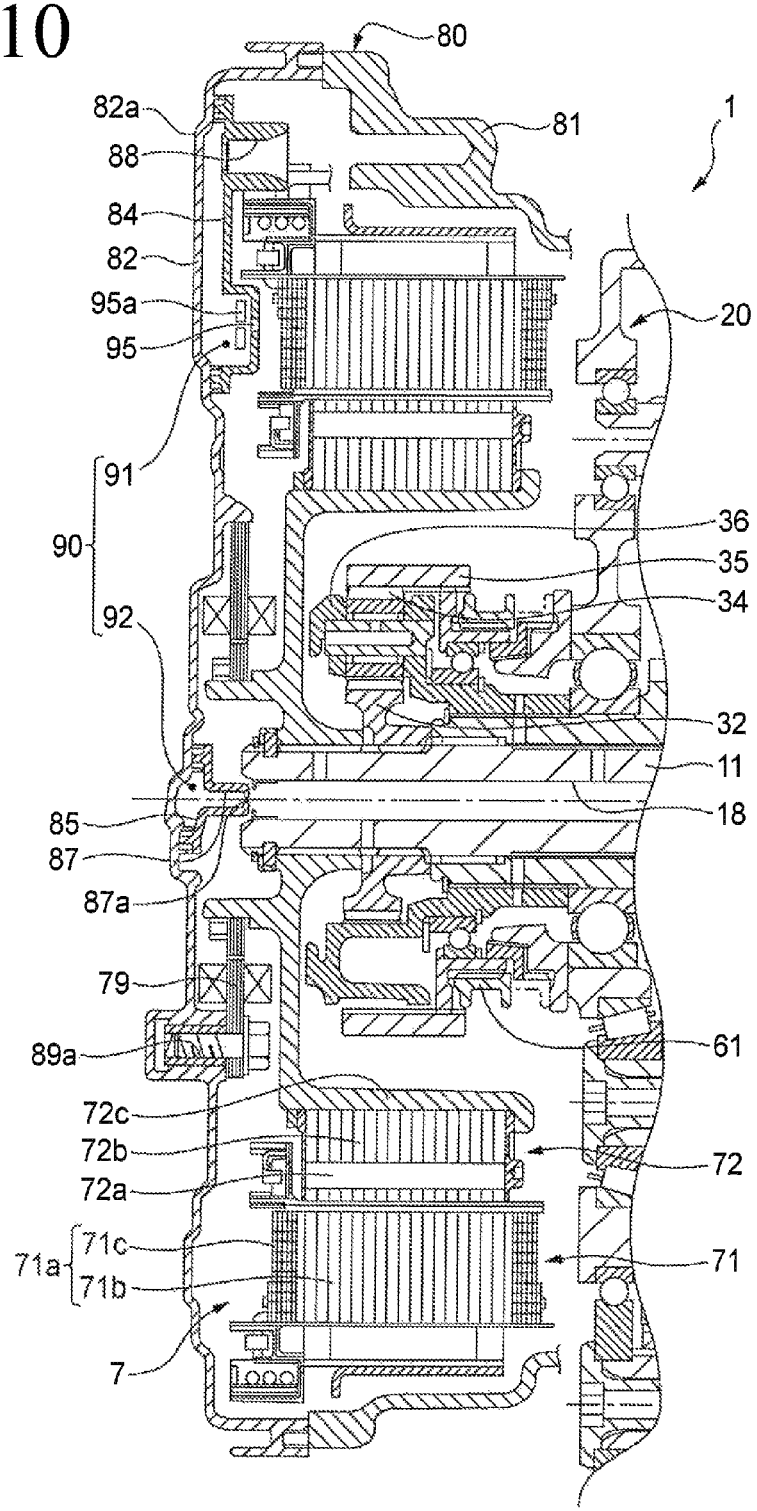
FIG. 10 is a cross-sectional view illustrating a main part of a driving system according to a modified example of the invention.

As a modified example of the embodiment, as shown in FIG. 10, at least one of the plural ejecting holes 95 may be provided with plural throttle valves 95a capable of controlling the flow rate of the ejected lubricant. In this case, the plural throttle valves 95a are closed when the output of the electric motor 7 is in the air-cooling-handleable output range (that is, the output range where the temperature of the coil may be handled by air-cooling without oil-cooling using the lubricant), and are released when the output of the electric motor becomes higher than the air-cooling-handleable output range. In order to smooth the temperature distribution in the stator 71, the flow rate of the lubricant of the upper portion is set to be large and the flow rate of the lubricant of the lower portion, of which the temperature becomes lower than the temperature of the upper portion due to the heat absorption from the lubricant reservoir, is set to be small based on the flow rate of the lubricant of the intermediate portion. An existing throttle valve may be used as the throttle valve 95a.

When the throttle valve 95a is closed in a case where the output of the electric motor 7 is in the air-cooling-handleable output range, degradation in welding property of the coil 71c due to the lubricant may be suppressed, the supply flow rate to the first main shaft 11 increases, and the lifespan of the speed changer 20 is extended. Since the temperature of the lubricant increases when the lubricant comes into contact with the electric motor 7, when the ejecting hole 95 is blocked by the throttle valve 95a, the heat of the entire oil path may be reduced. Accordingly, since the throttle valve is closed when the output of the electric motor 7 is in the air-cooling-handleable output range and is released when the output thereof becomes higher than the air-cooling-handleable output range, an effective cooling operation may be performed by oil-cooling and air-cooling.

Figure 11:
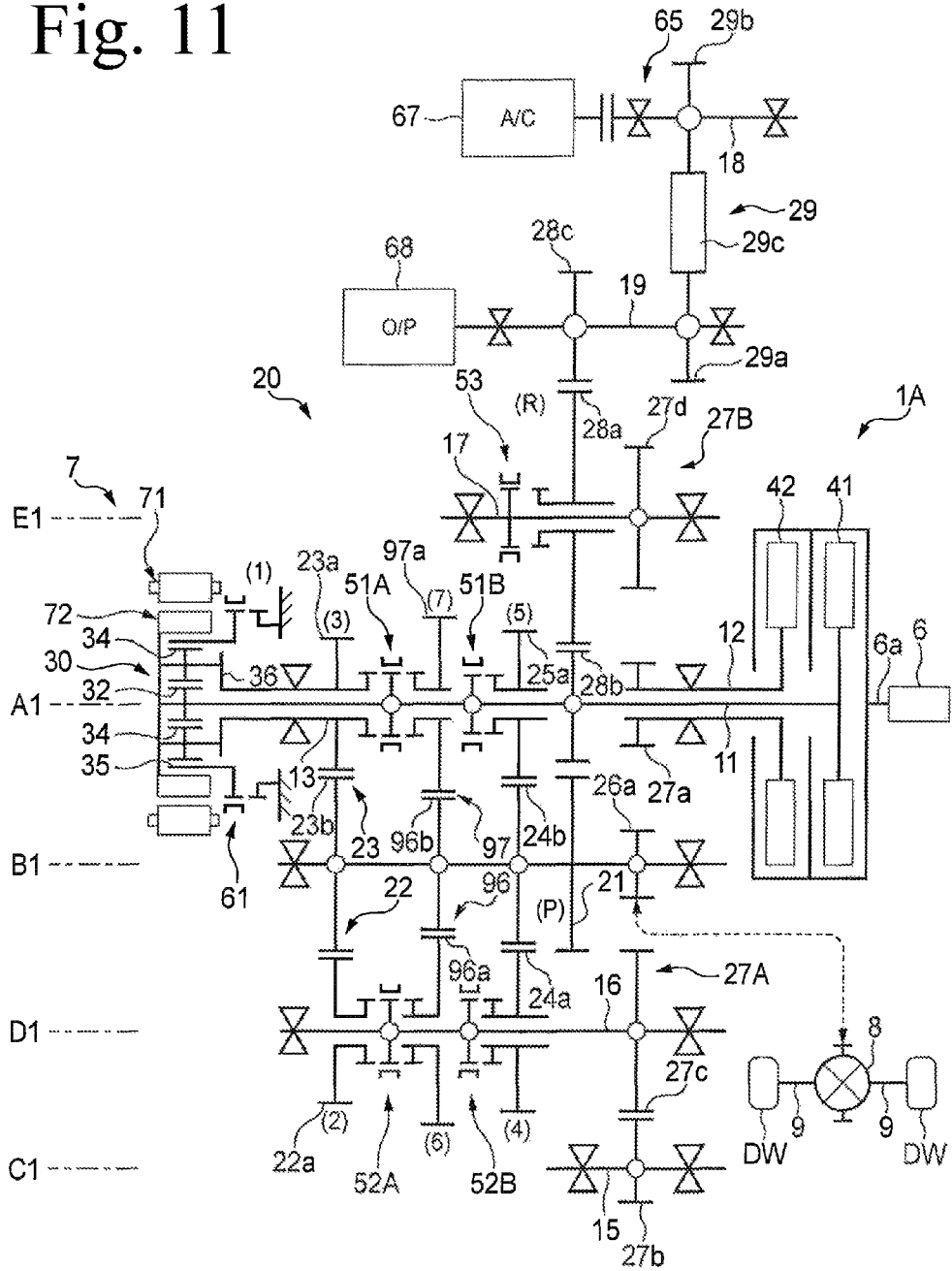
FIG. 11 is a schematic diagram illustrating a driving system according to another modified example of the invention.

Next, another example of the driving system will be described by referring to FIG. 11. A driving system 1A is different from the driving system 1 in that it includes a sixth-speed gear train 96 and a seventh-speed gear train 97 in addition to the planetary gear mechanism 30 constituting the differential speed reducer in the speed changer 20A and the second-speed gear train 22 to the fifth-speed gear train 25. Hereinafter, only difference between the driving system 1A and the driving system 1 will be described.

In the first main shaft 11, a seventh-speed driving gear 97a is provided between the third-speed driving gear 23a and the fifth-speed driving gear 25a so as to be rotatable relative to the first main shaft 11. A first speed changing shifter 51A, which connects the first main shaft 11 to the third-speed driving gear 23a or the seventh-speed driving gear 97a and releases the connection therebetween, is provided between the third-speed driving gear 23a and the seventh-speed driving gear 97a. A third speed changing shifter 51B which connects the first main shaft 11 to the fifth-speed driving gear 25a and releases the connection therebetween is provided between the seventh-speed driving gear 97a and the fifth-speed driving gear 25a. When the first speed changing shifter 51A is shifted to the third-speed connection position, the first main shaft 11 and the third-speed driving gear 23a are connected to rotate together. When the first speed changing shifter is shifted to the seventh-speed connection position, the first main shaft 11 and the seventh-speed driving gear 97a rotate together. When the first speed changing shifter 51A is at the neutral position, the first main shaft 11 rotates relative to the third-speed driving gear 23a and the seventh-speed driving gear 97a. When the third speed changing shifter 51B is shifted to the fifth-speed connection position, the first main shaft 11 and the fifth-speed driving gear 25a are connected to rotate together. When the third speed changing shifter 51B is at the neutral position, the first main shaft 11 rotates relative to the fifth-speed driving gear 25a.

In the second intermediate shaft 16, a sixth-speed driving gear 96a is provided between the second-speed driving gear 22a and the fourth-speed driving gear 24a so as to be rotatable relative to the second intermediate shaft 16. A second speed changing shifter 52A which connects the second intermediate shaft 16 to the second-speed driving gear 22a or the sixth-speed driving gear 96a and releases the connection therebetween is provided between the second-speed driving gear 22a and the sixth-speed driving gear 96a. A fourth speed changing shifter 52B which connects the second intermediate shaft 16 to the fourth-speed driving gear 24a and releases the connection therebetween is provided between the sixth-speed driving gear 96a and the fourth-speed driving gear 24a. When the second speed changing shifter 52A is shifted to the second-speed connection position, the second intermediate shaft 16 and the second-speed driving gear 22a are connected to rotate together. When the second speed changing gear is shifted to the sixth-speed connection position, the second intermediate shaft 16 and the sixth-speed driving gear 96a rotate together. When the second speed changing shifter 52A is at the neutral position, the second intermediate shaft 16 rotates relative to the second-speed driving gear 22a and the sixth-speed driving gear 96a. When the fourth speed changing shifter 52B is shifted to the fourth-speed connection position, the second intermediate shaft 16 and the fourth-speed driving gear 24a are connected to rotate together. When the fourth speed changing shifter 52B is at the neutral position, the second intermediate shaft 16 rotates relative to the fourth-speed driving gear 24a.

In the counter shaft 14, the third common driven gear 96b is integrally attached to the counter shaft 14 between the first common driven gear 23b and the second common driven gear 24b. The third common driven gear 96b meshes with the seventh-speed driving gear 97a provided in the first main shaft 11 so as to constitute the seventh-speed gear train 97 together with the seventh-speed driving gear 97a, and meshes with the sixth-speed driving gear 96a provided in the second intermediate shaft 16 so as to constitute a sixth-speed gear train 96 together with the sixth-speed driving gear 96a.

When the second clutch 42 is connected while the second speed changing shifter 52A is shifted to the sixth-speed connection position, a sixth-speed traveling mode may be performed. When the first clutch 41 is connected while the first speed changing shifter 51A is shifted to a seventh-speed connection position, a seventh-speed traveling mode may be performed. In the respective modes, the electric motor 7 may assist the traveling mode or charge the battery.

The oil pump 68 is fixed onto the oil pump auxiliary machine shaft 19 so as to be rotatable along with the oil pump auxiliary machine shaft 19. Also in the driving system 1A, the oil pump 68 is driven when the vehicle travels or stops since it rotates while being synchronized with the first main shaft 11. The lubricant which is pumped up by the oil pump 68 is supplied so as to be distributed to the respective units of the speed changer 20 inside the gear chamber 111 and the air compressor 67, and is also supplied so as to be distributed to the motor chamber 110.

The invention is not limited to the above-described embodiment, and appropriate modifications, improvements, and the like thereof may be made. For example, the hybrid vehicle has been described as the electric vehicle, but the invention is not limited thereto. For example, an electric vehicle only using an electric motor as a driving source may be used.

In the embodiment, a salient-pole-concentrated-winding coil is used as the coil of the electric motor 7, but a distributed winding coil may be used.

REFERENCE SIGNS LIST 1, 1A: driving system
7: electric motor
11: first main shaft (shaft of transmission)
11a: oil feeding hole (oil path)
20: speed changer (transmission)
67: air compressor
68: oil pump
71: stator
71c: coil (heat generating portion of electric motor)
71c1: radial center portion of bending portion
72: rotor
80: casing
82: side cover
82a: outer surface
84: oil path forming member (separate resin member)
90: oil path
91: substantially semicircular oil feeding path
92: radial oil feeding path
95: ejecting hole
95a: throttle valve
100: metal mesh (metallic member)

The invention claimed is:

1. An electric vehicle driving system comprising:
an electric motor serving as a power source;
a transmission;
a casing accommodating the electric motor and the transmission,
wherein the casing includes a side cover that covers a side surface portion of the electric motor,
wherein the side cover is formed of a resin having an insulating property and forms an oil path that supplies a cooling lubricant to a heat generating portion of the electric motor
wherein the heat generating portion of the electric motor is a coil of a substantially annular stator,
wherein the side cover includes plural ejecting holes that eject the lubricant toward an upper semicircular portion of the stator,
wherein the oil path includes:
a first path that is formed in a radial direction from a center of the side cover; and
a second path that communicates with the first path and is formed so as to correspond at least to the upper semicircular portion of the stator, the oil path communicating with an oil path provided in a shaft of the transmission, and
wherein the plural ejecting holes are circumferentially arranged in the second path at intervals.

2. The system of claim 1, wherein the oil path is formed inside the side cover by welding a separate resin member.

3. The system of claim 1, wherein a metallic member is disposed in the side cover by insert-molding so as to suppress radio noise.

4. The system of claim 1, wherein a motor-current-flowing-portion shielding material is provided between the side cover and the stator of the electric motor so as to suppress radio noise.

5. The system of claim 1, wherein metal plating is performed on the outer surface of the side cover so as to suppress radio noise.

6. The system of claim 1, wherein the lubricant which is ejected from the plural ejecting holes toward the upper semicircular portion of the stator is accumulated in a lubricant reservoir of a lower portion of the casing due to the own weight and is pumped up by an oil pump so as to be circulated.

7. The system of claim 1, wherein the plural ejecting holes are arranged so as to eject the lubricant toward the coil of the upper semicircular portion of the stator, and wherein the coil of the lower semicircular portion of the stator is cooled by the own weight of the lubricant.

8. The system of claim 1, wherein the plural ejecting holes are arranged so as to eject the lubricant toward radial center portions of bending portions of salient-pole-concentrated-winding coils of the stator.

9. The system of claim 1, wherein at least one of the plural ejecting holes is provided with a throttle valve that controls the flow rate of the ejected lubricant.

10. The system of claim 9, wherein the throttle valve is closed when the output of the electric motor is in an air-cooling-handleable output range and is released when the output becomes higher than the air-cooling-handleable output range.

11. The system of claim 1, wherein the lubricant accumulated in the lubricant reservoir of the lower portion of the casing is pumped up by the oil pump and is supplied to be distributed into an air compressor and the oil path, and wherein the lubricant supplied to the oil path is distributed into the heat generating portion of the electric motor and the transmission so as to lubricate the heat generating portion and the transmission.

12. The system of claim 1, wherein the electric motor is disposed in one end of the transmission, and the side cover is disposed at the opposite side of the transmission in the electric motor.

* * * * *